United States Patent

Warner, Jr. et al.

[11] Patent Number: 6,158,134
[45] Date of Patent: Dec. 12, 2000

[54] EQUIPMENT LEVELING DEVICE

[75] Inventors: Robert L. Warner, Jr., Royce City; Jerome F. Bayer, Allen; Walt Evanyk, Plano, all of Tex.

[73] Assignee: Ericsson Inc., Richardson, Tex.

[21] Appl. No.: 09/071,317

[22] Filed: May 1, 1998

[51] Int. Cl.[7] .................................................. G01C 9/36
[52] U.S. Cl. ................................ 33/390; 33/384; 33/370
[58] Field of Search ........................... 33/390, 374, 389, 33/384, 365, 370, 375, 371, 376, 377, 379, 284, 270; 248/188.2, 183.3

[56] References Cited

U.S. PATENT DOCUMENTS

| D. 247,428 | 3/1978 | Wood | 33/390 |
|---|---|---|---|
| D. 249,657 | 9/1978 | Griffiths | 33/390 |
| 544,587 | 8/1895 | Moore | 33/390 |
| 1,358,402 | 11/1920 | Thalhammer | 248/186.2 |
| 1,593,961 | 7/1926 | Wood | 33/390 |
| 3,820,249 | 6/1974 | Stone | 33/390 |
| 4,972,596 | 11/1990 | Brewer | 33/370 |
| 5,003,328 | 3/1991 | Gaynor | 354/81 |
| 5,406,713 | 4/1995 | Oman et al. | 33/366 |
| 5,669,832 | 9/1997 | Lehse . | |
| 5,836,516 | 11/1998 | Van Epps et al. | 239/273 |

FOREIGN PATENT DOCUMENTS

270967A1 of 1989 Germany .

*Primary Examiner*—Diego Gutierrez
*Assistant Examiner*—Maria Fernandez

[57] ABSTRACT

The present invention entails an equipment leveling device comprising a leveling head having a leveling instrument incorporated therein and a series of spaced apart support legs secured to the leveling head and projecting radially therefrom for engaging an object to be leveled and for supporting the leveling head adjacent the object during the leveling process. In the embodiment disclosed, each of the support legs is adjustable in length such that the leveling device can accommodate structures and objects of various size.

23 Claims, 7 Drawing Sheets

EQUIPMENT LEVELING DEVICE

FIELD OF THE INVENTION

The present invention relates generally to the leveling of mechanical equipment, and more particularly to a device for the leveling of cabinets in a telecommunication switching center.

BACKGROUND OF THE INVENTION

In a typical telecommunication switching center, the switching equipment is mounted in cabinets of various sizes which are anchored to a floor or other supporting structure. These cabinets are supported by a series of adjustable feet positioned around the base of the cabinet. To secure the cabinets, the support feet are anchored to the floor, which is typically a concrete floor, by drilling holes in the floor and extending expansion anchors through the feet into the floor. In some cases, the support feet may be anchored to access floor panels by directing bolts through the feet and through holes in the access panels.

In installing and anchoring cabinets housing telecommunication equipment, it is difficult to efficiently level the cabinets. There are a number of conventional approaches to leveling telecommunications cabinets. One approach entails using a slightly bowed glass tube level. A second approach entails employing a pendulum device. In either case, whether a glass tube level or a pendulum type leveling device is employed, a substantial amount of time is required to appropriately level these telecommunication cabinets. This is because installation personnel find it very difficult to quickly and easily adjust four corners of the cabinet to a level state. Thus, installation personnel using a glass tube level, for example, attempt to level these cabinets by a repeating trial and error process where the level is repeatedly positioned and repositioned about certain parts of the cabinet. In the end, this is often frustrating and certainly time-consuming. The use of a pendulum type of leveling device is not any more efficient than a glass tube leveling device. Indeed, pendulum type leveling devices can be even more time consuming than the glass tube type.

Accordingly, there is a need for an effective and efficient leveling device that is particularly suited for use in leveling telecommunications cabinets and other similar structures.

SUMMARY OF THE INVENTION

The present invention entails a leveling device that is particularly designed to level telecommunications cabinets and other structures and which overcomes the disadvantages and shortcomings of glass tube and pendulum type leveling devices. In one application, the leveling device of the present invention is designed to rest atop the cabinet being leveled and to generally span substantially the entire cabinet such that a single levelness reading will indicate to the installation personnel what part or parts of the cabinet require an elevation adjustment.

In the embodiment presented herein, the leveling device of the present invention includes a leveling head that is designed to be supported generally above the object or structure being leveled. A concentric type bubble leveling instrument forms a part of the leveling head. Extending radially from the level head is a plurality of support legs. Each support leg is adjusted to engage the telecommunication cabinet or other structure and to support the leveling head above the level of the cabinet. Once supported or erected over the cabinet, the installation personnel only have to make those elevation adjustments necessary to center the indicating bubble in the level.

In one embodiment of the present invention, the support legs that extend from the leveling head are adjustable in length. This allows the leveling device of the present invention to be used to level various standard size cabinets and structures. As disclosed herein, each of the legs include an outer end portion that is foldable between retracted and extended positions. In the retracted position, the legs are of a selected length to reach and seat about the top edge portion of a structure of a certain size. In the extended position, the legs extend further outwardly from the level head and are operative to reach and seat on the top edge portion of a larger structure. Consequently, the leveling device of the present invention is versatile as it can be used to level cabinets, structures and other objects of various sizes.

As will be appreciated from such portions of this disclosure, the leveling device disclosed herein is particularly suited for leveling telecommunications cabinets and other similar structures. But, it should be noted that the same leveling device can be used to level a wide range of other objects and structures.

It is therefore an object of the present invention to provide an equipment leveling device that is operative to level a telecommunications cabinet or other structure without requiring the leveling device to be moved from one position to another position on the structure being leveled.

Another object of the present invention is to provide a versatile equipment leveling device that can be used to level structures of different sizes.

Other objects and advantages of the present invention will become apparent and obvious from a study of the following description and the accompanying drawings which are merely illustrative of such invention.

DETAILED DESCRIPTION OF THE INVENTION

Figure 1:
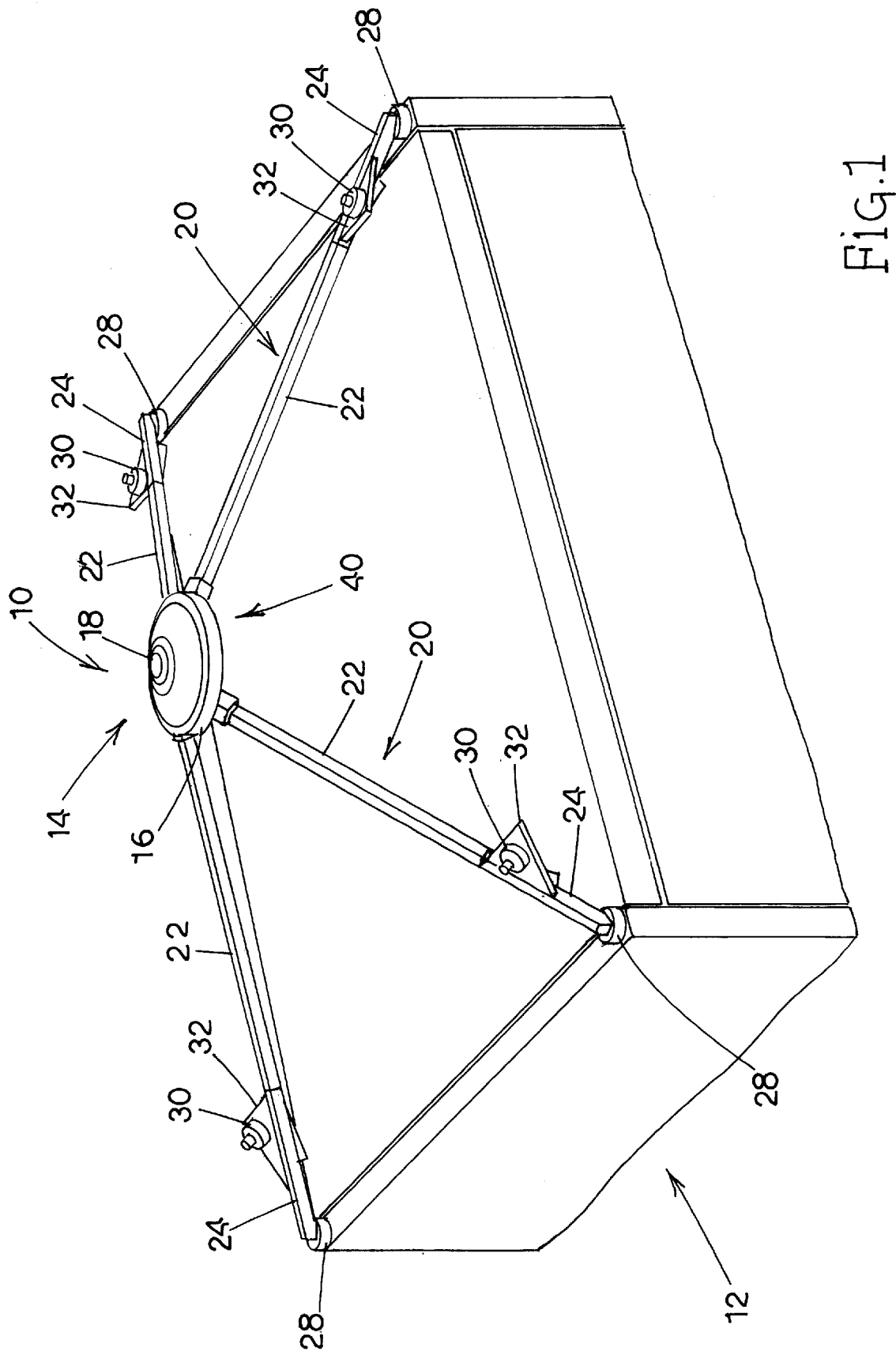
FIG. 1 is a perspective view of the equipment leveling device of the present invention disposed atop a cabinet structure.
Figure 2:
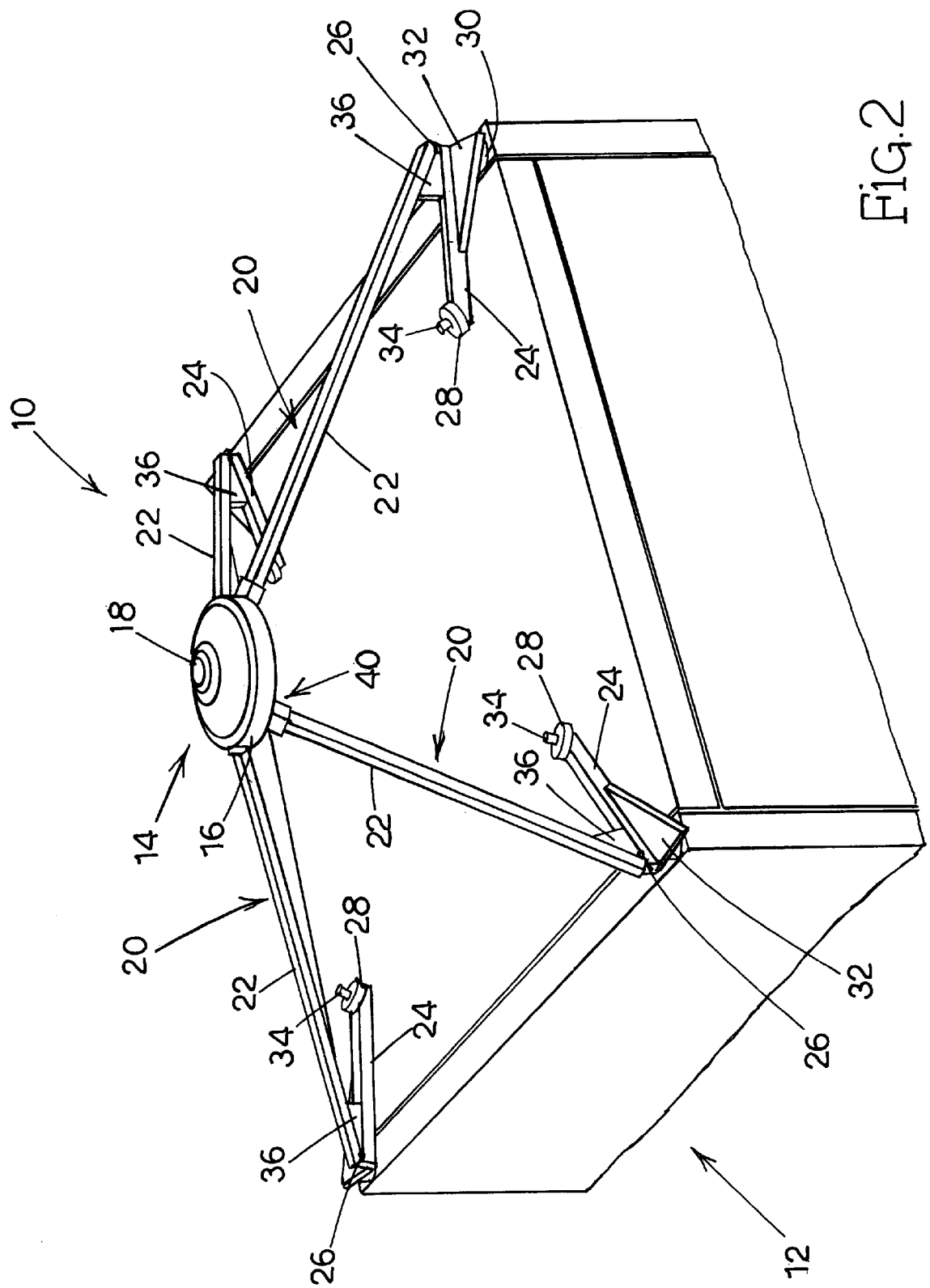
FIG. 2 is a perspective view of the equipment leveling device disposed atop a smaller cabinet structure and showing the legs in a folded and retracted position.

With further reference to the drawings, the leveling device of the present invention is shown therein and indicated generally by the numeral 10. As seen in FIGS. 1 and 2, the leveling device 10 is designed to engage a cabinet or other structure 12 for the purpose of leveling that cabinet or structure. In the embodiment illustrated herein, the leveling device 10 is adapted to be supported atop the cabinet or other structure 12 during the leveling process. However, as will be briefly discussed hereafter, the leveling device 10 can be disposed in various orientations with respect to a structure or an object being leveled.

Figure 6:
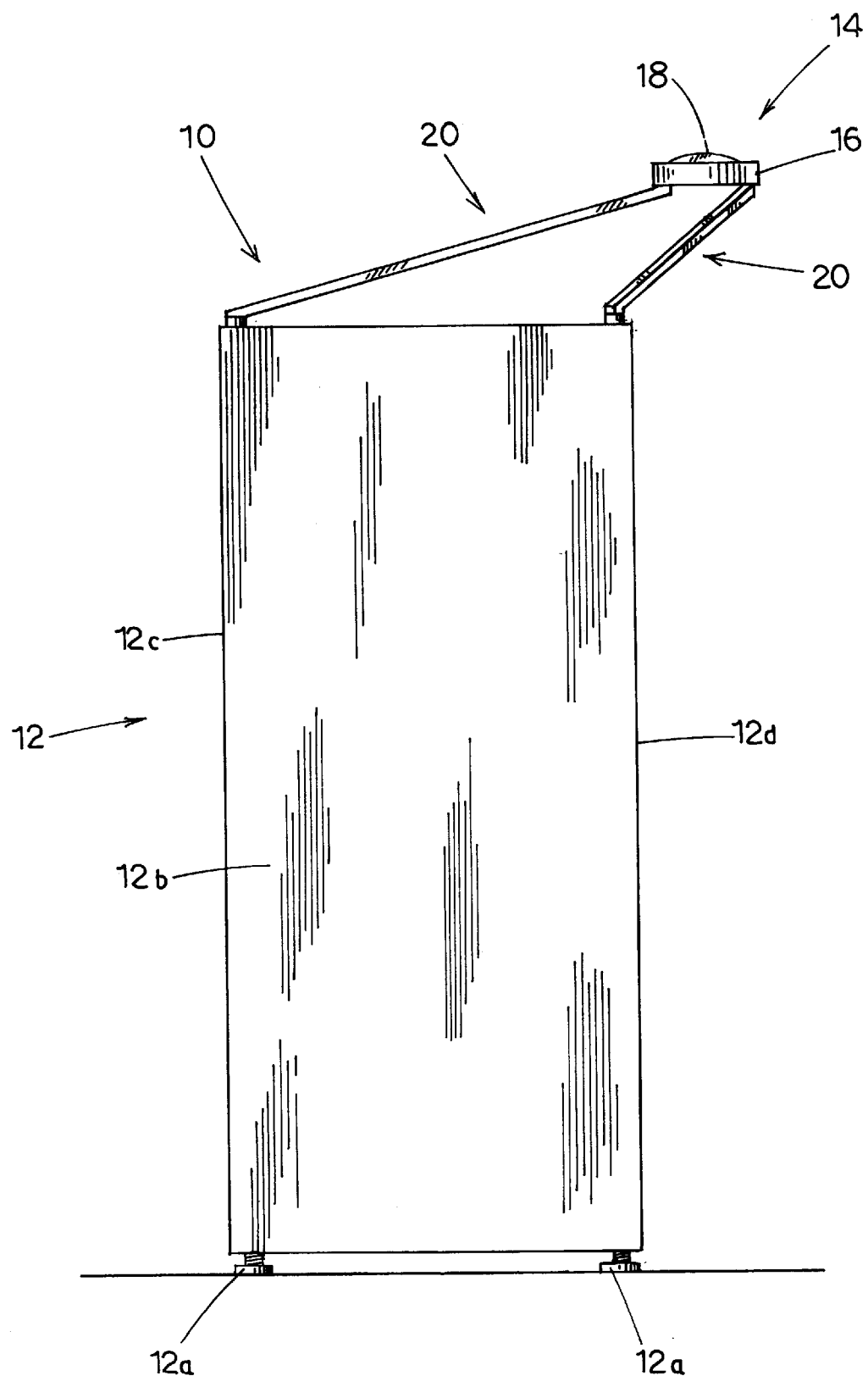
FIG. 6 is a side elevational view of a telecommunications cabinet showing the leveling device of the present invention mounted thereon and with the leveling head being disposed in an offset position with respect to the telecommunications cabinet.

Turning to a discussion of the leveling device 10, it is seen that the same includes a leveling head indicated generally by the numeral 14. Leveling head 14 includes a base 16 and has incorporated therein a leveling instrument. Various types of leveling instruments can be incorporated into the head 14. In the embodiment illustrated herein, the leveling instrument that forms a part of the leveling head is a concentric bubble type leveling instrument 18. It thusly follows that in the case of the embodiment illustrated herein, that the leveling head 14 includes a cavity or reservoir for holding a liquid that is confined underneath a transparent face that includes a series of concentric rings formed centrally therein. To yield levelness readings, the leveling head 14 would include an air bubble that would move within the leveling head from side to side in response to changes in the orientation of the leveling head 14 being changed. As with conventional bubble type levels, when the air bubble assumes a centered position within the innermost ring inscribed on the face of the leveling head 14, then the leveling head 14 is said to have assumed a level state. As will be discussed subsequently herein, in one embodiment the entire leveling head 14 is designed to project outwardly from the cabinet being leveled (FIG. 6). Here the leveling head 14 lies outside the top surface of the cabinet being leveled. In this case the leveling head 14 can be provided with a transparent bottom lens that allows an installer to view the air bubble from underneath the leveling head.

It will be appreciated by those skilled in the art that other types of leveling instruments could be incorporated into the leveling head 14. For example, in lieu of the concentric bubble type level 18, one could incorporate a tonal output into the leveling head which would increase or decrease in volume or at intermittent repetition rates as the orientation of the leveling head is changed.

For supporting the leveling head 14, there is provided a series of spaced apart support legs indicated generally by the numeral 20. As seen in FIGS. 1 and 2, the support legs of 20 are secured to the leveling head 14 and project radially therefrom.

In the embodiment of FIGS. 1 and 2, each support leg includes an inner end portion 22 and an outer end portion 24. A pivot joint is formed between the inner end portion 22 and the outer end portion 24. This enables the outer end portion 24 to be moved from an extended position where it aligns with the inner end portion 22 (FIG. 1) to a folded or retracted position where the outer end portion 24 projects inwardly towards the leveling head 14 (FIG. 2).

To form the pivot joint in the embodiment illustrated herein, there is provided a hinge structure 26 that interconnects the inner end portion 22 with the outer end portion 24. Details of the hinge structure 26 are not dealt with here in detail because such is not per se material to the present invention and further those skilled in the art will understand and appreciate that various types of hinges and pivot joints could be incorporated into the structure of the legs 20. However, it should be noted that the hinge or interconnecting structure may be of the type that would permit the outer end portion 24 to assume a set and stationary folded position. Thus, the hinge 26 or other interconnecting structure could be of a friction or detent type such that when the outer end portion 24 is rotated and folded to its retracted position the hinge or other interconnecting structure through friction or a detent mechanism will hold or fix the outer end portion 24 in such a retracted position.

Figure 3:
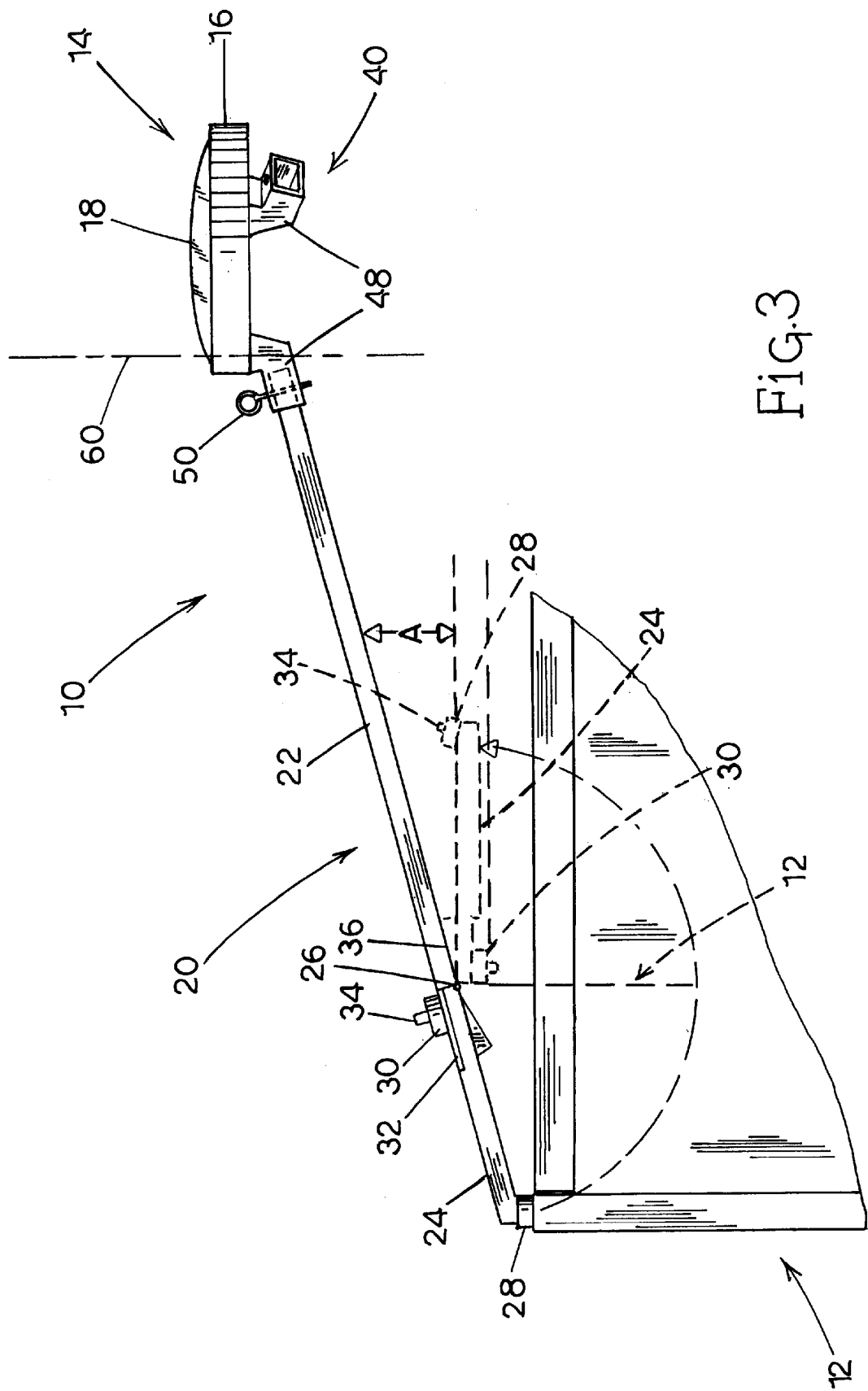
FIG. 3 is a fragmentary side elevational view of a portion of the equipment leveling device illustrating the foldable nature of the legs that form a part of the equipment leveling device.

Viewing the outer end portion 24 of each leg, it is seen that the same includes an outer foot 28 and an inner foot 30 that is secured on a flange or bracket 32 that is in turn secured to the outer end portion 24 of the leg. In the embodiment illustrated herein, the feet include a centering pin 34 that projects outwardly from the foot. As is clearly shown in the drawings, the outer foot 28 and the inner foot 30 are directed generally in opposite directions. As seen in FIG. 3, when the outer end portion 24 assumes an extended position, centering pin 34 on the inner foot 30 projects generally upwardly while the centering pin 34 on the outer foot 28 projects generally downwardly for contact with a cabinet or other structure being leveled. However, when the outer end portion 24 is rotated to its retracted or folded position, pin 34 on the inner foot 30 then assumes an orientation where it projects generally downwardly for engagement with a different size cabinet or structure while the outer foot 28 projects generally upwardly. Also, as shown in the drawings, the inner feet 30 and their associated flanges 32 are offset with respect to the main axis of the accompanying leg. However, because the legs are rotatable from side to side about a vertical axis, it follows that both sets of feet can be appropriately adjusted and aligned with the structure or object being leveled. As will be discussed later, it is not imperative that the legs be of the paticular design shown in FIG. 2. For example, it is not required that the legs pivot at the base of the leveling head.

It is important in the leveling process for the leveling head 14 to be disposed in an appropriate reference plane. For the embodiment depicted in FIGS. 1 and 2 this means that the effective length of each of the legs when supporting the leveling head should be equal. Thus, when the outer end portion 24 is folded to the retracted position (FIG. 2), it is important that the attitude of each of the outer end portions of the legs be substantially the same with respect to the leveling head 14. Consequently, each of the legs 20, about an area adjacent the hinge 26, is provided with a stop 36. Note in FIG. 3 that the stop 36 effectively limits the clockwise rotation of the outer end portion 24. Consequently, the stop 36 effectively causes the outer end portion 24 to form the specific acute angle A (FIG. 3) with respect to the inner end portion 22 when the outer end portion rotates fully to the folded retracted position.

Figure 4:
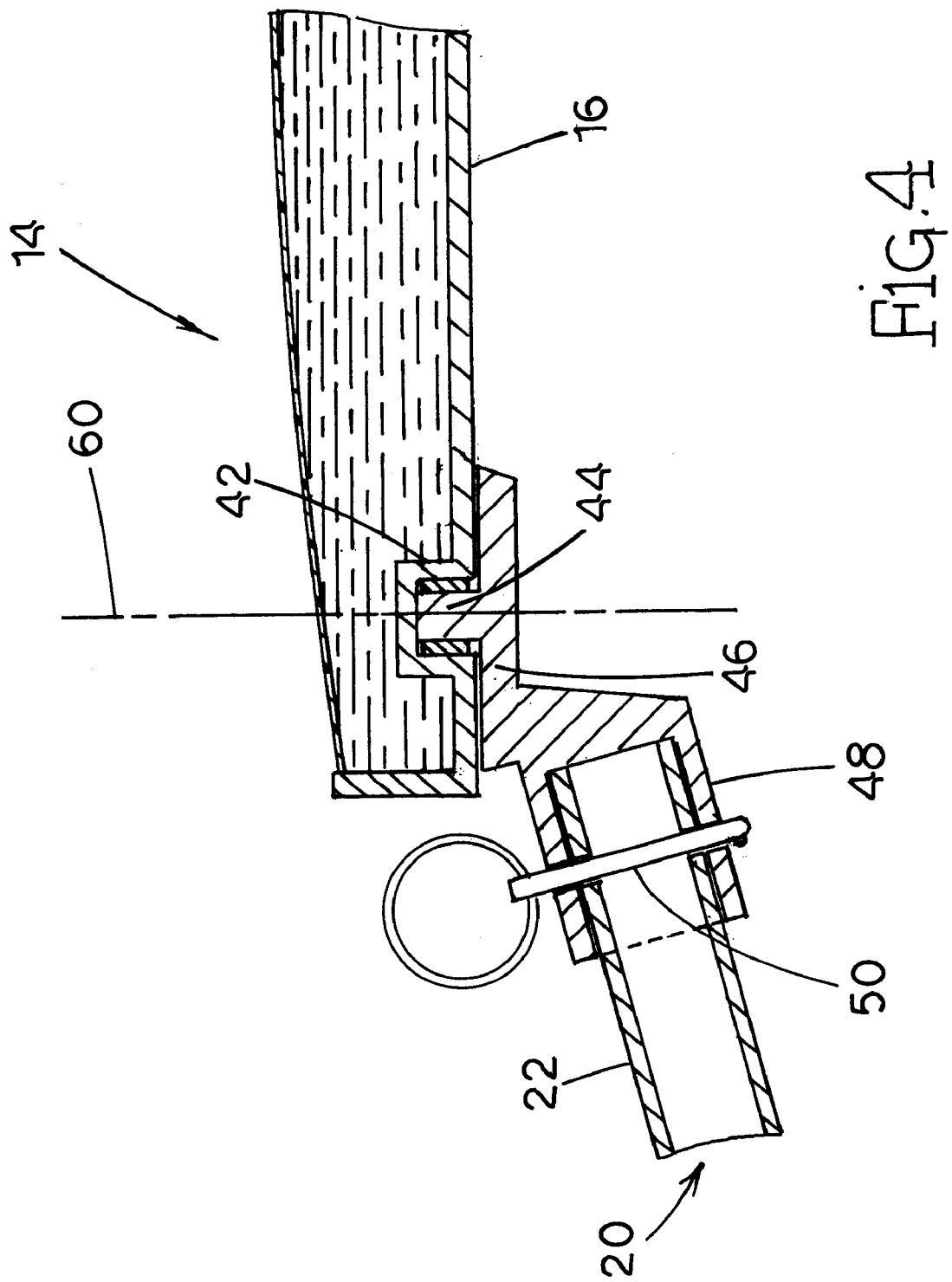
FIG. 4 is a fragmentary sectional view of a portion of the leveling head, the rotating socket and a depending leg, all of which form a part of the leveling device.

In the embodiments of FIGS. 1–4, each of the support legs 20 is pivotally connected to the leveling head 14 for rotation about a generally vertical axis 60 as viewed in FIGS. 3 and 4. To accommodate this pivotable movement, there is provided a series of sockets, indicated generally by the numeral 40, which are connected in spaced apart relationship about the bottom of the leveling head 14. As particularly illustrated in FIG. 4, the lower portion of a leveling head 14 includes a series of bushings 42 that are formed or inserted into the lower portion of the leveling head 14. A stub shaft 44 is bearinged or otherwise rotatable connected into the formed bushing 42. A base portion 46 extends from the stub shaft 44 and includes a connector or receiver 48. The connector 48 basically comprises an open aperture that is designed to receive the innermost end of a respective leg 20. To secure the leg 20 within the socket 40, there is provided a locking pin 50 which is adapted to extend through a pin opening in the connector 48 and through a pin opening formed in the innermost end of a respective leg 20. Accordingly, each leg 20 can be detachably secured to the socket 40.

It is appreciated, that as viewed in the drawings herein, that the socket 40 is rotatable about the generally vertical axis 60 that extends through the stub shaft 44. Thus, when a leg 20 is connected to a socket 40, the leg can be swung back and forth, side to side, about the axis of a stub shaft 44. However, it is appreciated that the axis 60 of a stub shaft 44 is stationary and therefore, the legs 20 are generally not movable up and down relative to the leveling head 14. This, of course, means that when used in a leveling process, the respective legs 20 are disposed at a set and generally equal angle with respect to the leveling head 14.

The above description of the present invention refers to one embodiment and it is to be understood that various design and structural variations may be incorporated into the leveling device 10 without departing from the basics of the present invention. For example, the feet 28 and 30 are shown with a centering pin 34 that in practice could project into a bore or aperture formed in the object to be leveled. It is to be understood, however, that other types of feet can be used including feet having suction cups, magnets, rubber pads, etc. In addition, in lieu of the folding legs, the present invention could be provided with telescoping legs with each leg being designed to be extended equal distances from the leveling head to maintain the leveling head in an appropriate reference plane. Graduations could be placed on such extendable legs to ensure proper adjustments when using the leveling device 10 on even or uneven surfaces.

Turning now to applications of the leveling device 10 of the present invention, FIG. 1 shows the leveling device 10 disposed on a relatively large cabinet such as a cabinet for housing telecommunications equipment. Note that the outer end portions 24 of the legs 20 assume extended positions. Here the outer end portion 24 of each leg aligns with the inner end portion 22 and the outer foot 28 of each leg is seated about a top portion of the corner of the cabinet 12. Although the individual legs 20 can be swung back and forth about the axis of the socket 40, it is appreciated that the angle of each leg with respect to the plane of the leveling head 14 is generally equal. This sets the leveling head 14 in an appropriate reference plane. By viewing the bubble and the relationship of the bubble with respect to the concentric rings, the installation personnel can adjust the elevation of certain parts of the cabinet so as to cause the entire cabinet as a whole to assume a level state. This can be done in a number of ways, but typically cabinets housing telecommunication equipment will include adjustable feet disposed around the bottom perimeter of the cabinet and these feet can be adjusted. Thus, by utilizing the leveling device 10 of the present invention, installation personnel can move directly to the point or points that need elevation adjustment and those adjustments can be made without having to move the leveling device from one position to another position about the cabinet 12.

In the case of a smaller cabinet, which may be of a standard size, the leveling device 10 can be made to be compatible with such by simply folding the outer end portions 24 of the legs to the retracted position as shown in FIG. 2. In this configuration, it is seen that the set of inner feet 30 are now projected downwardly for engagement with the top surface of the smaller cabinet 12 shown in FIG. 2. Now the same leveling process that was described above can be carried out for the smaller cabinet 12.

As noted above the sockets 40 do not have to rotate in the manner described above and illustrated in FIGS. 1–4. The sockets 40 may be fixed relative to the leveling head 14. If there were only a small number of standard equipment (cabinet) sizes, then there would not necessarily be a great need for the pivoting legs that form a part of the embodiment illustrated in FIGS. 1–4. By incorporating static sockets into the leveling head 14, the leveling device 10 would be less expensive to manufacture and perhaps easier to use. For example, it may be easier to achieve a rigid deployment of the leveling device 10 when the sockets 40 are fixed relative to the head rather than where the sockets rotate relative to the head. Perhaps more importantly, the use of static sockets would essentially eliminate any concern for synchronizing the angles of rotation of the legs for the purpose of maintaining a proper attitude for the reference plane of the leveling head.

Figure 5:
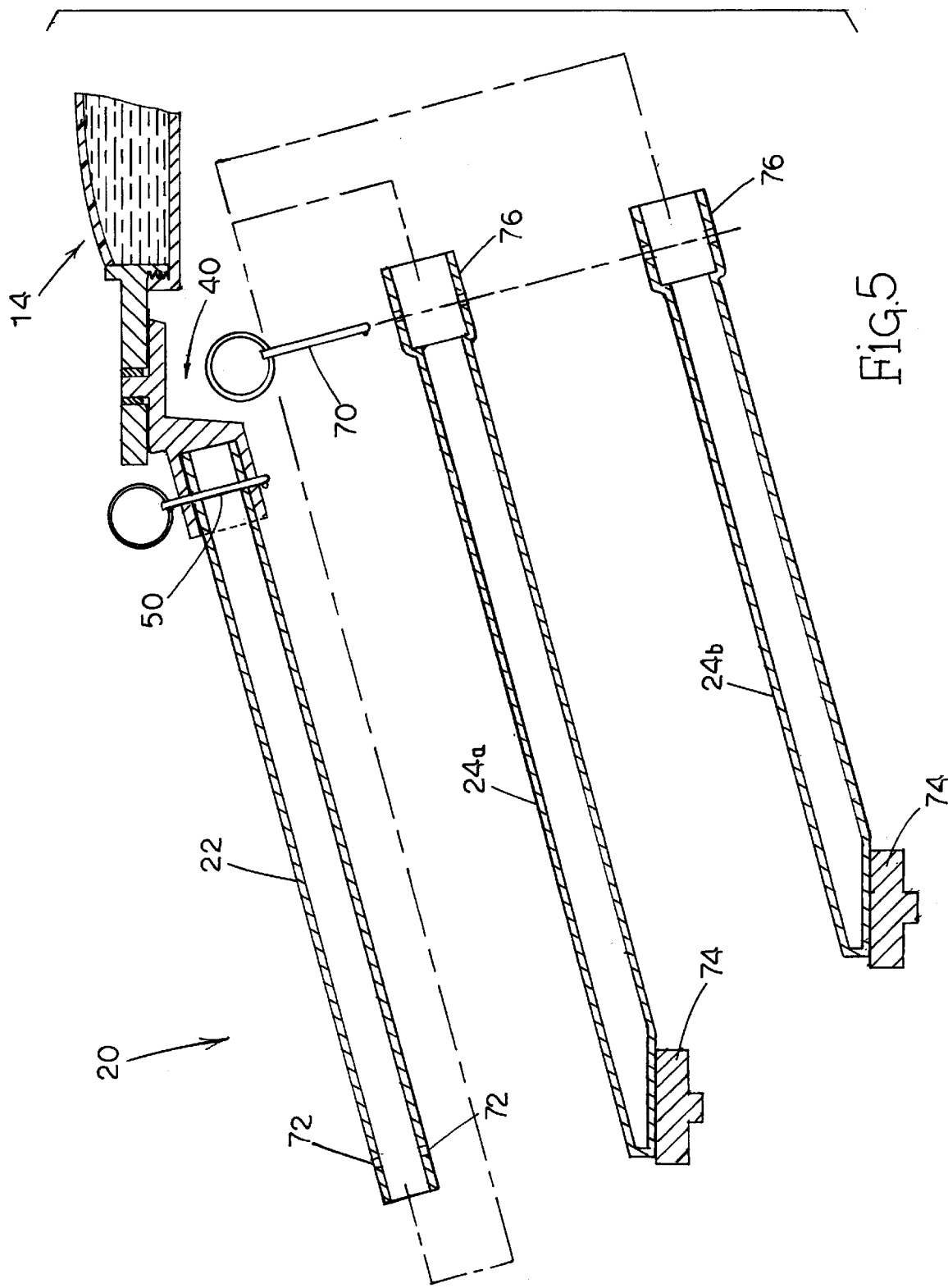
FIG. 5 is a sectional view that illustrates an alternate design for the leg assemblists associated with the leveling device of the present invention.

In the embodiment shown in FIGS. 1–4, the effective length of the legs 20 are adjustable due to the fact that the inner and outer portion of the legs are connected through a hinge. There are, of course, other approaches to providing legs of adjustable length. In FIG. 5, for example, there is shown another embodiment of the present invention. In the embodiment of FIG. 5, the various legs that make up the leveling device include two or more separate sections that can be joined together to yield a particular length. In the case of the embodiment shown in FIG. 5, it is seen that each leg includes an inner section 22 that is adapted to be secured within a socket 40. As discussed above, the socket 40 may rotate or may be static. Provided with each inner leg section 22 is one or more outer leg sections such as noted by references 24a and 24b in FIG. 5. Note that each outer leg section 24a and 24b includes a connecting sleeve or socket 76. The connecting sleeve 76 is adapted to be inserted onto the outer end portion of the inner leg section 22. The outer end portion of leg section 22 includes an aperture or opening 72. Thus it is appreciated that either leg section 24a or 24b can be connected to section 22 by inserting the sleeve 76 around the outer end portion of leg section 22 and then coupling the two leg sections together by inserting the connecting pins 70 through both the connecting sleeve 76 and through the aperture or opening 72 formed in the inner leg section 22.

In the embodiment just described and shown in FIG. 5, it is seen that the effective length of each leg 20 can be varied by selecting different lengths for the outer leg portion of the assembly. By using either leg section 24a or leg section 24b, the leveling device can be adapted to be compatible with two different size cabinets. With respect to this embodiment, it is noted that each of the interchangeable outer leg sections 24a and 24b includes a contact foot 74 that is adapted to engage and rest upon the cabinet structure being leveled.

Finally turning to FIGS. 6–9, yet another embodiment of the present invention is shown therein. In this embodiment, the leveling device 10 is designed such that leveling head 14 is capable of being disposed in an offset relationship with respect to the underlying cabinet 12. More particularly, in the embodiment shown in FIGS. 1–4, the design of the leveling device is such that the leveling head 14 generally assumes a central position over the cabinet structure 12 during the leveling process. However, as will become apparent, the leveling head 14 does not have to be centrally located over the cabinet structure 12. In fact, as illustrated in FIG. 6, the leveling device 10 can be designed and constructed such that the leveling head 14 projects outside of the plane of any side of the cabinet structure 12.

Viewing FIGS. 6–9 in more detail it is seen that the cabinet structure 12 includes a series of adjustable feet 12a. Further the cabinet structure 12 includes a pair of opposed sides 12b, a back 12c and a front 12d. Disposed above the cabinet 12 is the leveling device 10. Note in this case, the legs 20 that form a part of the leveling device 10 are not of equal length nor are they disposed at the same angle with respect to the leveling head 14. However, the length of the legs 20 and the angle of the legs with respect to the leveling head 14 are fixed such that the lower terminal ends of the respective legs lie in the same plane, that is a plane that is parallel to the reference plane of the leveling head 14. In this embodiment it is contemplated that the legs 20 would be fixed relative to the leveling head 14.

Figure 7:
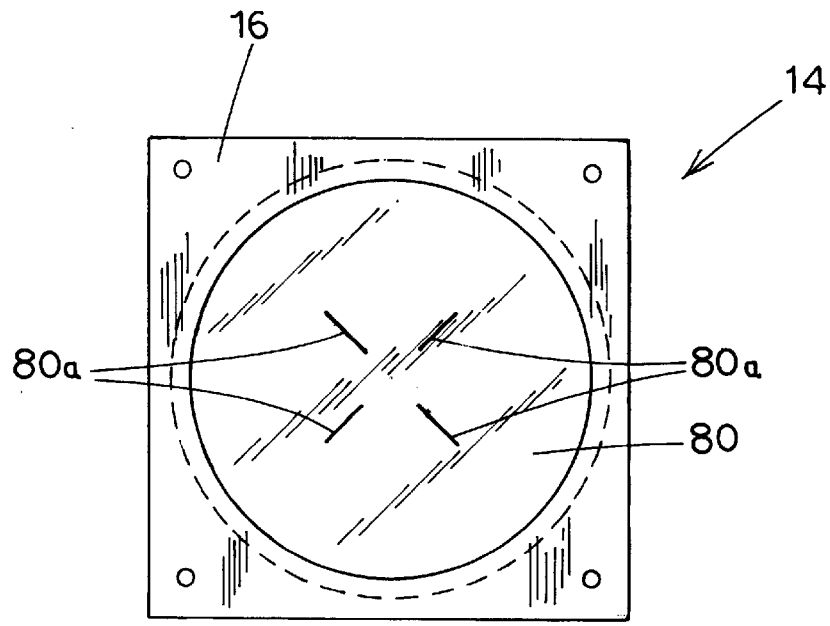
FIG. 7 is a bottom plan view of an alternate design for the leveling head of the present invention.
Figure 8:
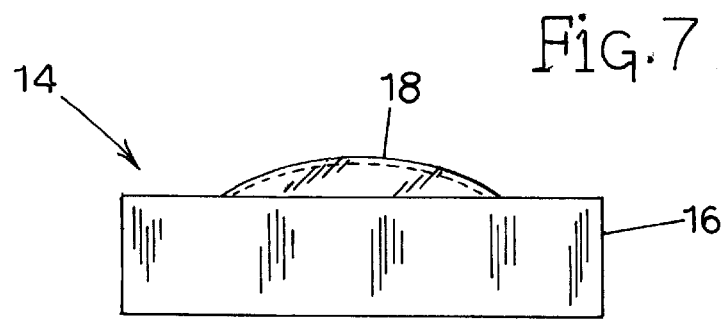
FIG. 8 is a side elevational view of the leveling head shown in FIG. 7.
Figure 9:
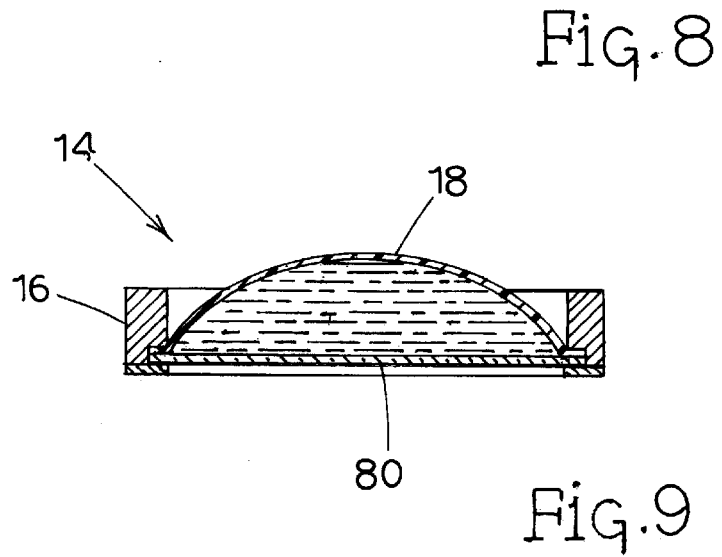
FIG. 9 is a side sectional view of the leveling head shown in FIGS. 7 and 8.

The leveling head 14 incorporated into the embodiment shown in FIG. 6 is designed such that the leveling head 14 can be read or viewed from above the instrument or underneath the instrument. As shown in FIGS. 7–9, the leveling head 14 for the embodiment shown in FIG. 6 comprises a base 16 with a bubble type leveling instrument 18 incorporated therein. However, the bottom of the leveling head 14 includes a transparent lens or pane 80. The transparent bottom 80 forms the lower boundary of the leveling head 14 and actually functions to retain and hold the liquid contained within the leveling instrument 18. in order to assist personnel in viewing the leveling instrument 18, the bottom lens 80 is provided with a series of sighting marks 80a. These marks are centrally located and are inscribed on the bottom lens 80 of the leveling head 14. Consequently, when an individual utilizes the leveling device 10 shown in FIGS. 6–9, he or she can determine the state of levelness of the cabinet 12 even while the installer's head remains below the leveling head 14.

The above discussion has dealt with the employment of the leveling device atop a cabinet or other object to be leveled. It should be appreciated that the leveling head 14 and the other related structure can be modified to allow inverted mounting for use under equipment such as wall mounted air conditioners and other structures that are suspended or mounted from a top portion of the structure. In addition, miniature versions of the leveling device could be mounted in recreational vehicles such as motor homes, pop-up campers and the like for leveling the same at campsites.

Therefore, as appreciated from the above discussion and specification, the leveling device 10 of the present invention can be used to simplify the leveling procedures employed for leveling structures and objects including cabinets having telecommunications equipment housed therein. More particularly, the leveling device of the present invention has the advantage of speeding up the leveling process as the same does not have to be moved from one location to another location during the leveling procedure. Once the leveling device 10 has been appropriately placed about the structural object being leveled, all that is required is that the object or structure be adjusted in elevation at one or more points so as to bring the bubble within the confines of the innermost ring. This is accomplished while the leveling device 10 assumes one position of engagement with the structure or object to be leveled.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An equipment leveling device for leveling equipment comprising: a leveling head having a leveling instrument incorporated therein; a series of spaced apart support legs secured to the leveling head and projecting radially therefrom for engaging an object to be leveled and for supporting the leveling head adjacent the object to be leveled and each leg including an outer end portion and an inner end portion, said inner end portions having respective longitudinal axes, wherein the outer end portion is foldable and movable between an extended position where it is generally aligned with the longitudinal axis of the corresponding inner end portion and a retracted and folded position where it extends inwardly towards the leveling head and at an elevation generally below at least a segment of the inner end portion of the leg.

2. The equipment leveling device of claim 1 wherein each leg includes at least two feet.

3. The equipment leveling device of claim 2 wherein the two feet are secured to opposite portions of the outer end portion of each leg.

4. The equipment leveling device of claim 3 wherein the two feet of each leg are directed in opposite directions.

5. The equipment leveling device of claim 4 wherein each leg includes a pivot joint disposed between the outer and inner end portions of the legs.

6. The equipment leveling device of claim 5 wherein the pivot joint of each leg includes a hinge.

7. The equipment leveling device of claim 6 wherein each leg is provided with a stop that is disposed adjacent to the pivot joint for limiting the pivotable movement of the outer end portion of the leg and establishing a set retracted position for the outer end portion.

8. The equipment leveling device of claim 7 wherein the stop is fixed to one of the end portions of the leg for engagement with the other end portion so as to set the retracted position for the outer end portion.

9. The equipment leveling device of claim 8 wherein the legs extending from the leveling head are of an equal distance in length.

10. The equipment leveling device of claim 9 wherein each of the legs is pivotally connected to the leveling head about a vertical axis such that the respective legs can be swung back and forth from side to side about the vertical axis.

11. The equipment leveling device of claim 10 wherein the elevation of the respective legs with respect to the leveling head is generally fixed.

12. The equipment leveling device of claim 10 including a series of pivoting sockets secured to the leveling head, each socket being rotatable about a respective vertical axis and including a connecting end for connecting to a respective leg.

13. The equipment leveling device of claim 12 wherein the connecting end of each socket includes an open receiver having a pin opening formed therein, and a locking pin for insertion through a transverse opening formed in the leg and through the pin opening extending through the open receiver thereby permitting the respective legs to be detachably secured to the respective sockets.

14. The equipment leveling device of claim 10 wherein each of the feet include means for engaging a surface portion of the object being leveled.

15. The equipment leveling device of claim 14 wherein the means for engaging a surface portion of the object being leveled include a pin member that is adapted to be inserted within an aperture formed in the object being leveled.

16. The equipment leveling device of claim 10 wherein the leveling instrument incorporated into the leveling head includes a concentric circle bubble level.

17. The leveling device of claim 1 wherein the leveling head is disposed above and at least partially outwardly past an edge of the object to be leveled.

18. The leveling device of claim 17 wherein the leveling head includes a bottom transparent lens that enables the leveling head to be read from below.

19. A leveling device for leveling structures and objects comprising:
   (a) a leveling head having a leveling instrument incorporated therein;
   (b) a series of spaced apart support legs secured to the leveling head and projecting radially therefrom;
   (c) a series of pivot connectors associated with the leveling head and interconnected between the leveling head and the legs for permitting the respective legs to swing from side to side about a vertical axis relative to the leveling head;
   (d) each leg including an outer end portion and an inner end portion and a pivot joint disposed between the outer and inner end portions that permit the outer end portion to be moved from an extended position where it generally aligns with the inner end portion to a folded retracted position where the outer end portion projects inwardly from an outer end of the inner end portion;
   (e) a first set of feet disposed on the legs for engaging a surface portion of an object to be leveled when the outer end portions of the legs assume the extended position; and
   (f) a second set of feet, independent of the first set of feet, disposed on the legs for engaging a surface of an object to be leveled when the outer end portions of the legs assume the folded retracted position.

20. The leveling device of claim 19 wherein in the folded retracted positions the outer end portion of each leg forms an angle with respect to the inner end portion.

21. The leveling device of claim 19 wherein a stop is disposed on each leg that limits the pivotable movement of the outer end portion of the leg and effectively sets the angle that is formed between the outer end portion and the inner end portion of the leg when the outer end portion assumes the folded retracted position.

22. The leveling device of claim 21 wherein the outer end portions of the respective legs lie in generally the same plane when the outer end portions assume the folded retracted position.

23. The leveling device of claim 22 including a series of rotatable sockets secured to the leveling head with each socket being rotatable mounted about an axis and with each socket including a connector that connects to a respective leg such that the leg can be swung from side to side about the axis.

* * * * *